United States Patent
Örtegren et al.

(10) Patent No.: US 12,241,391 B2
(45) Date of Patent: Mar. 4, 2025

(54) CRANKCASE GAS SEPARATOR

(71) Applicant: Alfdex AB, Landskrona (SE)

(72) Inventors: Anders Örtegren, Landskrona (SE); Mikael Walter, Stockholm (SE); Thomas Andersson Aginger, Skärholmen (SE); Magnus Hansson, Löddeköpinge (SE)

(73) Assignee: ALFDEX AB, Landskrona (SE)

(*) Notice: Subject to any disclaimer, the term of this patent is extended or adjusted under 35 U.S.C. 154(b) by 0 days.

(21) Appl. No.: 18/713,836

(22) PCT Filed: Nov. 25, 2022

(86) PCT No.: PCT/EP2022/083291
§ 371 (c)(1),
(2) Date: May 28, 2024

(87) PCT Pub. No.: WO2023/110364
PCT Pub. Date: Jun. 22, 2023

(65) Prior Publication Data
US 2025/0035020 A1  Jan. 30, 2025

(30) Foreign Application Priority Data
Dec. 17, 2021  (EP) ..................................... 21215528

(51) Int. Cl.
*F01M 13/04* (2006.01)

(52) U.S. Cl.
CPC ..... *F01M 13/04* (2013.01); *F01M 2013/0422* (2013.01)

(58) Field of Classification Search
CPC .................................................. F01M 13/04
See application file for complete search history.

(56) References Cited

U.S. PATENT DOCUMENTS

| 7,704,300 B2 * | 4/2010 | Szepessy | B01D 45/14 |
| | | | 96/57 |
| 7,875,098 B2 * | 1/2011 | Hallgren | G01P 3/487 |
| | | | 96/423 |

(Continued)

FOREIGN PATENT DOCUMENTS

| CN | 104234782 B | 9/2016 |
| CN | 111734513 A | 10/2020 |

(Continued)

OTHER PUBLICATIONS

International Search Report, issued in PCT/EP2022/083291, dated Mar. 6, 2023.

(Continued)

*Primary Examiner* — Kevin A Lathers
(74) *Attorney, Agent, or Firm* — Birch, Stewart, Kolasch & Birch, LLP

(57) ABSTRACT

A crankcase gas separator includes a separator housing delimiting at least part of a separation space and forming at least part of a liquid phase receiving circumferential inner wall surface, a wall member forming at least part of a gas passage, and a gas pressure regulating valve including at least part of the gas passage. The separator includes a separate tube member extending from a position radially inside the inner wall surface into the gas passage. A liquid tight seal between the separate tube member and the wall member is formed by a joint arranged radially outside the inner wall surface.

20 Claims, 3 Drawing Sheets

(56) References Cited

U.S. PATENT DOCUMENTS

| | | | |
|---|---|---|---|
| 10,967,388 B2* | 4/2021 | Örtegren | ............... B04B 11/02 |
| 11,059,053 B2 | 7/2021 | Eliasson et al. | |
| 2011/0011380 A1* | 1/2011 | Lagerlof | ............... F01M 11/10 |
| | | | 123/573 |
| 2011/0281712 A1 | 11/2011 | Schlamann et al. | |

FOREIGN PATENT DOCUMENTS

| | | |
|---|---|---|
| DE | 20 2016 101 388 U1 | 5/2017 |
| DE | 20 2016 104 755 U1 | 12/2017 |
| FR | 2 886 558 B1 | 4/2009 |
| WO | WO2010/051994 A1 | 5/2010 |
| WO | WO 2016/198274 A1 | 12/2016 |

OTHER PUBLICATIONS

Written Opinion of the International Searching Authority, issued in PCT/EP2022/083291, dated Mar. 6, 2023.

* cited by examiner

CRANKCASE GAS SEPARATOR

TECHNICAL FIELD

The invention relates to a crankcase gas separator.

BACKGROUND

Crankcase gas is ventilated from a crankcase of an internal combustion engine, ICE. Crankcase gases may be disposed of in an environmentally friendly manner instead of being ventilated in untreated form to the atmosphere. For certain types of combustion engines, legislation even requires crankcase gases to be disposed of in an environmentally friendly manner.

Crankcase gases may comprise inter alia blow-by gases, oil, other liquid hydrocarbons, soot, and other solid combustion residues. In order to dispose of crankcase gases suitably, the gas is separated from oil, soot, and other residues. The separated gas may be led to an air intake of the combustion engine or vented to the atmosphere, and the oil may be led back to an oil sump of the combustion engine optionally, via an oil filter for removing soot and other solid residues from the oil.

A centrifugal separator may be used for disposing of crankcase gas. The crankcase gas is led into a rotor of the centrifugal separator and heavy constituents of the crankcase gases, such as oil and soot, are separated as a liquid phase from a cleaned gaseous phase. The liquid phase is led out of the centrifugal separator via a liquid outlet. The gaseous phase is lead out of the centrifugal separator via a gas outlet and may be directed to an air intake of the ICE.

As shown e.g., in U.S. Pat. No. 7,704,300 and WO 2010/051994, the gas outlet may be provided with a gas pressure regulating valve such that a certain pressure difference is established between a separation space of the separator and the air intake of the combustion engine.

Prior art crankcase gas separators may rely on one or more O-rings to seal a gas passage extending from the separation space of the separator to the gas pressure regulating valve.

SUMMARY

One problem with the use of O-rings for sealing a passage from a separation space of a crankcase gas separator to a gas pressure regulating valve is that O-rings may be cumbersome to mount during assembly of the separator.

In a crankcase gas separator, it is an object of the invention to prevent a separated liquid phase from entering a gas pressure regulating valve of the separator.

According to an aspect of the invention, the object is achieved by a crankcase gas separator comprising a separator housing delimiting at least part of a separation space and forming at least part of a liquid phase receiving circumferential inner wall surface, a wall member forming at least part of a gas passage, and a gas pressure regulating valve comprising at least part of the gas passage. The separation space is arranged in fluid communication with the gas passage. The separator comprises a separate tube member extending from a position radially inside the inner wall surface into the gas passage. A liquid tight seal between the separate tube member and the wall member is formed by a joint arranged radially outside the inner wall surface.

Since the separator comprises the separate tube member extending from a position radially inside the inner wall surface into the gas passage and the liquid tight seal between the separate tube member and the wall member formed by a joint arranged radially outside the inner wall, it is prevented that a liquid phase separated on and flowing along the circumferential inner wall surface of the separator housing, leaks into the gas pressure regulating valve.

As a result, the above-mentioned object is achieved.

Moreover, since the joint is arranged radially outside the inner wall surface, during assembly of the crankcase gas separator, the position for the joint is easily accessible for the provision of the joint as such. The joint may be provided in a number of different ways, as discussed further below.

The crankcase gas separator is arranged for cleaning crankcase gas from an internal combustion engine, ICE. Such an ICE may be configured for propelling a vehicle, a vessel, or may be a stationary combustion engine, for instance for driving a generator for generating an electrical current.

The crankcase gas separator is configured to separate heavy constituents of the crankcase gas, such as oil, other liquid hydrocarbons, soot, and other solid combustion residues from the crankcase gas as the liquid phase.

The crankcase gas, also referred to as blow-by gas, may be ventilated from the crankcase of the ICE via a crankcase ventilation system. The centrifugal separator may form part of the crankcase ventilation system.

The crankcase gas is the result of the high pressure within the cylinders of the ICE forcing some of the combustion gas and liquid and solid residues past the piston rings down into the crankcase of the ICE. If not ventilated, an increased pressure within the crankcase may cause engine oil to leak out of the ICE and the liquid and solid residues may contaminate and/or dilute the engine oil.

In the separation space of the crankcase gas separator, the crankcase gas is separated into the liquid phase and a gaseous phase.

For instance, the separator may be a centrifugal separator and accordingly, may comprise a rotor arranged in the separation space. The rotor may be connected to a rotor shaft, which is journalled in the separator housing.

Herein, the crankcase gas separator may alternatively be referred to simply as separator, or as centrifugal separator. The gas pressure regulating valve may alternatively be referred to as the regulating valve or as the valve.

The separator comprises an inlet for the crankcase gas. The inlet is arranged in fluid communication with the separation space. The gas passage may form part of, or lead to, a gas outlet for the gaseous phase separated in the separator. The crankcase gas separator also comprises a liquid outlet for the liquid phase separated in the separator. The liquid outlet is arranged in fluid communication with the separation space.

In operation of the centrifugal separator, crankcase gas is led into the separation space and the rotor via the inlet for the crankcase gas. The crankcase gas enters the rotor from a central portion thereof. As the rotor rotates, the heavy constituents are separated therein and are propelled from an outer periphery of the rotor as droplets against the circumferential inner wall surface. The droplets form the separated liquid phase which is led out of the centrifugal separator via the liquid outlet. The gaseous phase i.e., the crankcase gas relieved of its heavy constituents, is led out of the centrifugal separator via the gas passage and the gas outlet.

The centrifugal separator may be configured for concurrent separation. That is, the two separated phases travel in the same direction through the rotor of the centrifugal separator. More specifically, as discussed above, the liquid phase travels from the central portion of the rotor towards its periphery. So does the other separated phase i.e., the gaseous phase. It travels from the central portion of the rotor towards its periphery while the heavy constituents are separated therefrom and leaves the rotor at its periphery.

The rotor may comprise a separation aid e.g., a number of separating members, which improve the separation of the heavy constituents from the crankcase gas. The separation aid may comprise separating members in the form of e.g., axially extending vanes which are directed radially from the rotor shaft or stacked frustoconical separation discs. As the rotor rotates, the heavy constituents are forced against radially inwardly facing surfaces of the separating members whereon droplets of the separated phase are formed and flow towards the outer periphery of the rotor.

The separator housing is stationary in relation to the ICE. The rotor shaft and the rotor are arranged to rotate in relation to the separator housing. The rotor shaft may be rotated by a driving member, such as a turbine wheel, an electric, pneumatic, or hydraulic motor, etc.

During operation of the centrifugal separator, the axial direction may extend substantially vertically, and a liquid outlet of the separation space may be arranged at a lower end portion thereof. Thus, gravity may cause the droplets of the separated liquid phase to flow along the circumferential inner wall surface towards the liquid outlet.

The gas pressure regulating valve is configured to regulate a gas pressure within the separation space. For instance, the pressure regulating valve may ensure that a minimum pressure is maintained level within the separation space. That is, below the minimum pressure level, the pressure regulating valve may close the gas passage and above the minimum pressure level, the pressure regulating valve may open the gas passage.

The gas pressure regulating valve may comprise a valve seat and a movable member configured to seal against the valve seat.

The gas passage may extend at least upstream of the valve seat.

The wall member may for instance form part of the separator housing or of a housing of the pressure regulating valve. A further option may be for the wall member to form part of a housing forming at least part of a separator housing and a valve housing.

The separator housing may comprise one or more separate parts.

Since the separate tube member extends from the position radially inside the inner wall surface, an inner opening of the separate tube member is arranged at a radial distance from the inner wall surface. Thus, the liquid phase flowing along the inner wall surface cannot reach the inner opening of the separate tube member.

The separate tube member is separate in the sense that it forms a separate element which is mounted in the separator during manufacturing thereof. In the finished separator, the separate tube member is linked or connected by the joint to the wall member.

The separate tube member may be of any suitable form.

The joint between the separate tube member and the wall member may be of any suitable form e.g., according to embodiments discussed below.

According to some embodiments, the joint may be a welded joint. In this manner, a liquid tight joint may be provided between the separate tube member and the wall member in a convenient manner.

A welded joint may be provided in an automated step of a manufacturing process of the separator.

According to some embodiments, the joint may be a press fitted joint. In this manner, a liquid tight joint may be provided between the separate tube member and the wall member in a convenient manner.

A press fitted joint may be provided in an automated step of a manufacturing process of the separator, in which automated step the separate tube member is pressed into the wall member.

According to some embodiments, a press fitted joint may be combined with a welded joint.

According to some embodiments, the joint may be a mechanically interlocking joint. In this manner, a liquid tight joint may be provided between the separate tube member and the wall member in a convenient manner.

An example of a mechanically interlocking joint is a thread joint wherein the separate tube member includes external threads and is screwed into the wall member.

The mechanically interlocking joint may be provided in an automated step of a manufacturing process of the separator.

According to some embodiments, a mechanically interlocking joint may be combined with a welded joint.

According to some embodiments, the joint may be a glue joint. In this manner, a liquid tight joint may be provided between the separate tube member and the wall member in a convenient manner.

A glue joint may be provided in an automated step of a manufacturing process of the separator.

According to embodiments, the joint may form the only liquid tight seal between the separate tube member and the wall member. In this manner, not further seals may be required to achieve the tightness between the tube member and the wall member.

Moreover, only the joint has to be tested for tightness between the separation space and a portion of the gas passage outside the separation space, such as a portion of the gas passage in the gas pressure regulating valve. Thus, tightness between the separation space and a portion the gas passage outside the separation space may be tested in one leakage test operation.

According to some embodiments, the separate tube member may be made from a rubber material. In this manner, the separate tube member may have elastic properties, which may be advantageous to achieve the liquid tight seal.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
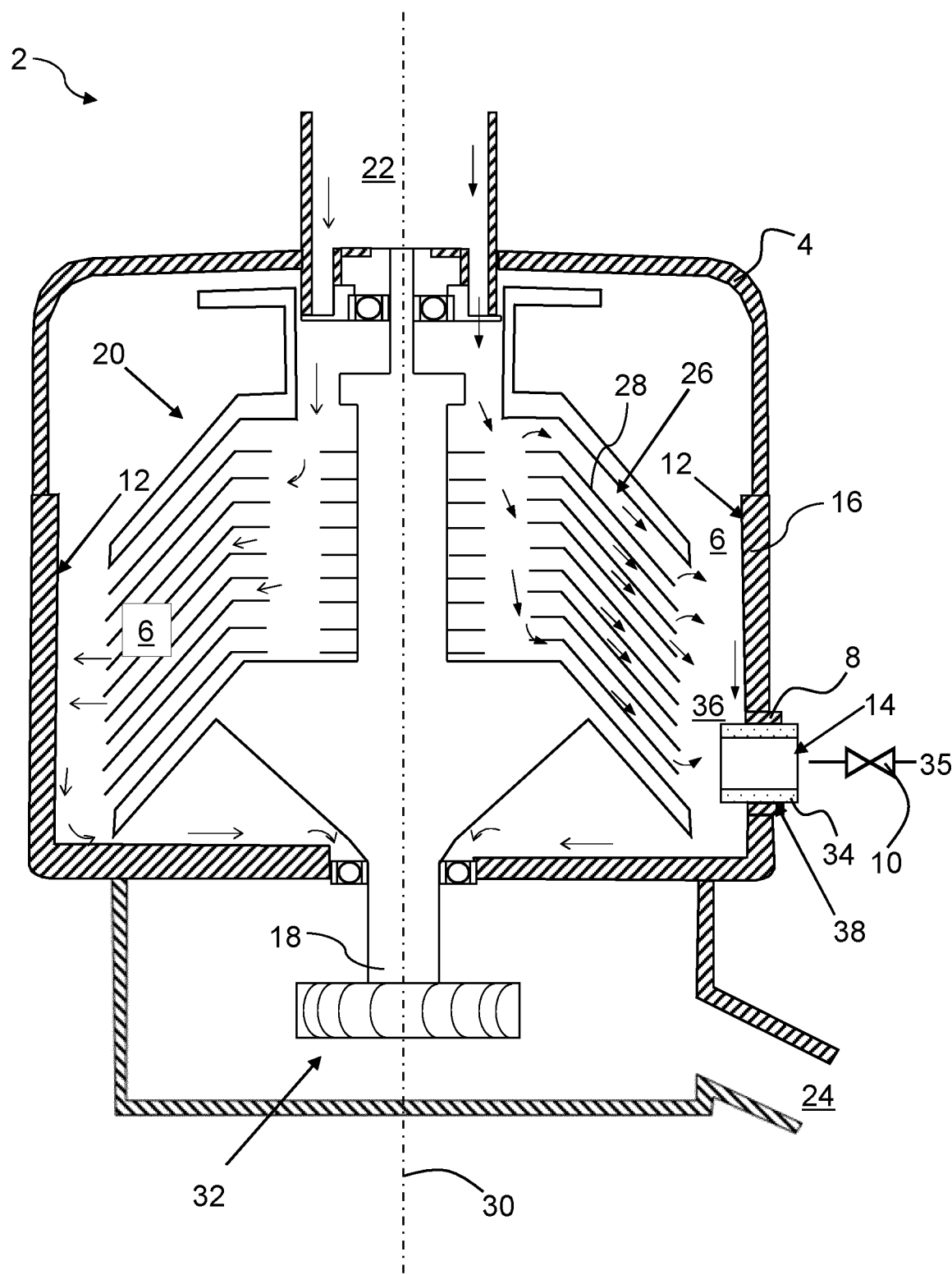
FIG. 1 schematically illustrates a cross section through a crankcase gas separator according to embodiments, FIGS. 2a and 2b schematically illustrate cross sections through a portion of respective crankcase gas separators according to embodiments, and FIG. 3 schematically illustrates a cross section through a portion of a crankcase gas separator according to embodiments.

FIG. 1 schematically illustrates a cross section through a crankcase gas separator 2 according to embodiments.

The separator 2 is a centrifugal separator. The separator 2 is configured for separating a liquid phase and a gaseous phase from a crankcase gas coming from an internal combustion engine.

The separator 2 comprises a separator housing 4 delimiting at least part of a separation space 6. The separator 2 further comprises a wall member 8 and a gas pressure regulating valve 10.

The separator housing 4 forms at least part of a liquid phase receiving circumferential inner wall surface 12.

More specifically, the separator housing 4 comprises the liquid phase receiving circumferential inner wall surface 12. The circumferential inner wall surface 12 is circumferential in the sense that it extends circumferentially around the separation space 6. The inner wall surface 12 is configured to receive thereon droplets of separated liquid phase and thus, is a liquid phase receiving wall surface.

The wall member 8 forms at least part of a gas passage 14. The gas pressure regulating valve 10 comprises at least part of the gas passage 14.

The gas passage 14 is configured for leading a separated gaseous phase out of the separation space 6 and at least partially through the valve 10. Accordingly, the separation space 6 is arranged in fluid communication with the gas passage 14. The gas passage 14 may lead towards a gas outlet 35 for the gaseous phase from the separator 2.

The gas pressure regulating valve 10 is only schematically indicated in FIG. 1. The valve 10 may be a biased valve configured to open when a predetermined minimum gas pressure prevails in the separation space 6. Thus, the valve 10 ensures that the gas pressure within the separation space 6 is above the predetermined minimum gas pressure. The valve 10 prevents a low pressure, such as a sub-atmospheric pressure, connected to the valve 10 from drawing crankcase gas through the separator 2.

The separator housing 4 may be formed from one or more parts. At least, the separator housing 4 comprises a surrounding side wall 16 having the liquid phase receiving circumferential inner wall surface 12.

In the illustrated embodiments, the separator housing 4 comprises the wall member 8.

A rotor shaft 18 extends through the separation space 6 in an axial direction. A rotor 20 wherein the crankcase gas is separated into the liquid phase and the gaseous phase is arranged inside the separation space 6. The rotor 20 is connected to the rotor shaft 18.

The liquid phase receiving circumferential inner wall surface 12 extends circumferentially around the rotor 20 and the droplets of separated liquid phase received on the inner wall surface 12 are separated in the rotor 20.

The rotor shaft 18 is journalled in the separator housing 4. The rotor shaft 18 may be journaled e.g., in ball bearings, roller bearings, or plain bearings.

The separator 2 further comprises an inlet 22 into the separation space 6 for the crankcase gas, the gas outlet 35 for the separated gaseous phase, and a liquid outlet 24 for the separated liquid phase.

In an operating position of the separator 2, i.e. in the position shown in FIG. 1, the gas passage 14 is arranged at a lower end portion of the separation space 6.

In FIG. 1, the separated liquid phase flows from the separation space 6 through the lower bearing to the liquid outlet 24. Additionally or alternatively, other flow paths for the liquid phase from the separation space 6 to the liquid outlet 24 may be provided.

The rotor 20 comprises a separation aid in the form of a stack 26 of separation discs 28, each separation disc 28 having a frustoconical, shape. Between the separation discs 28 in the stack 26, interspaces are formed through which the crankcase gas travels from an inner periphery towards an outer periphery while being separated into the liquid phase and the gaseous phases as the rotor 20 rotates. In FIG. 1 only some of the separation discs 28 are indicated.

In these embodiments the frustoconical separation discs 28 are stacked with their wide ends facing downwardly. In alternative embodiments, the frustoconical separation discs may be stacked with their wide ends facing upwardly.

As mentioned above, the centrifugal separator is configured for concurrent separation. The crankcase gas enters the rotor 20 from a central portion thereof. As the rotor 20 rotates, the heavy constituents are separated therein and are propelled from an outer periphery of the rotor 20 as droplets against the circumferential inner wall surface 12.

In alternative embodiments, other types of separation aids may be utilised, such as e.g. axially extending vanes projecting radially outwardly from the rotor shaft.

The rotor shaft 18 is brought to rotate about a rotational axis 30 by a driving member 32. In the embodiments illustrated in FIG. 1, the drive member 32 is a turbine connected to the rotor shaft 18. The turbine is driven by oil, such as engine lubricating oil.

The separator 2 is configured to be positioned with the rotational axis 30 extending substantially vertically during use of the separator 2. Accordingly, the liquid outlet 24 is arranged at a lower end of the housing 4. The separated liquid phase may thus, be transported by gravity towards the liquid outlet 24.

The flow of crankcase gas, gaseous phase, and liquid phase through the separator 2 is indicated with small arrows in FIG. 1.

If not otherwise stated, axial and radial references and directions used herein are defined in relation to the rotational axis 30.

The separator 2 comprises a separate tube member 34 extending from a position 36 radially inside the inner wall surface 12 into the gas passage 14. That is, the position 36 is within the separation space 6 at a radial position thereof inside the inner wall surface 12.

Accordingly, a portion of the gas passage 14 extends through the tube member 34.

A liquid tight seal between the separate tube member 34 and the wall member 8 is formed by a joint 38 arranged radially outside the inner wall surface 12.

Accordingly, the separated liquid phase flowing along the inner wall surface 12 is prevented from entering the gas pressure regulating valve 10.

More specifically, a radially inner end of separate tube member 34 is arranged at a distance from the inner wall surface 12. Thus, the liquid phase flowing along the inner wall surface 12 cannot enter the separate tube member 34. The gaseous phase can flow out of the separation space 6 via the tube member 34. Namely, the gaseous phase can without any problem enter the inner end of the tube member 34 at the position 36. Any leakage of separated liquid phase into the valve 10 between the tube member 34 and the wall member 8 is prevented by the joint 38.

The joint 38 is schematically indicated in FIG. 1. In its broadest aspects, the invention is not limited to any particular kind of joint 38, as long as a liquid tight seal is provided by the joint 38.

The joint 38 may for instance be a glue joint. That is, a glue, an adhesive, or a resin may form the joint 38 between the tube member 34 and the wall member 8. Such a glue, adhesive, or resin suitably is oil resistant i.e., oil cannot dissolve the joint 38, in order to ensure the liquid tight seal provided by the joint 38.

According to alternative embodiments, the joint 38 may be a press fitted joint. That is, the tube member 34 has a slightly larger outer diameter than an inner diameter of the wall member 8. Thus, a press fit is achieved between the tube member 34 and the wall member 8, which provides the liquid tight seal.

Further embodiments of the joint 38 are discussed below with reference to FIGS. 2a and 2b.

The joint 38 may form the only liquid tight seal between the separate tube member 34 and the wall member 8. In this manner, only the joint 38 has to be provided in the separator 2 to ensure that no liquid phase leaks from the separation space 6 into the gas pressure regulating valve 10.

According to embodiments, the separate tube member 34 may be made from a same material as the wall member 8. In this manner, the separate tube member 34 and the wall member 8 may have the same or at least similar properties.

For instance, in this manner, the separate tube member 34 and the wall member 8 may have a same temperature coefficient. Thus, e.g. the separate tube member 34 and the wall member 8 may expand and contract due to temperature changes without shifting their positional relationship.

If the material of the separate tube member 34 and the wall member 8 is a weldable material, such as a thermoplastic material, forming the separate tube member 34 and the wall member 8 from the same material provides the possibility for the joint 38 to be a welded joint.

According to alternative embodiments, the separate tube member 34 may be made from a different material than the wall member 8. In this manner, different material properties may be utilised for providing a liquid tight joint 38.

In line with such embodiments, according to an embodiment, the separate tube member 34 may be made from a rubber material. In this manner, the elastic properties of the rubber material may be utilised to provide the liquid tight joint 38 between the separate tube member 34 and the wall member 8.

Mentioned as examples, the rubber material may comprise one or more of natural rubber, synthetic rubber such as EPDM, silicone, or a thermoplastic elastomer.

Figure 2A:
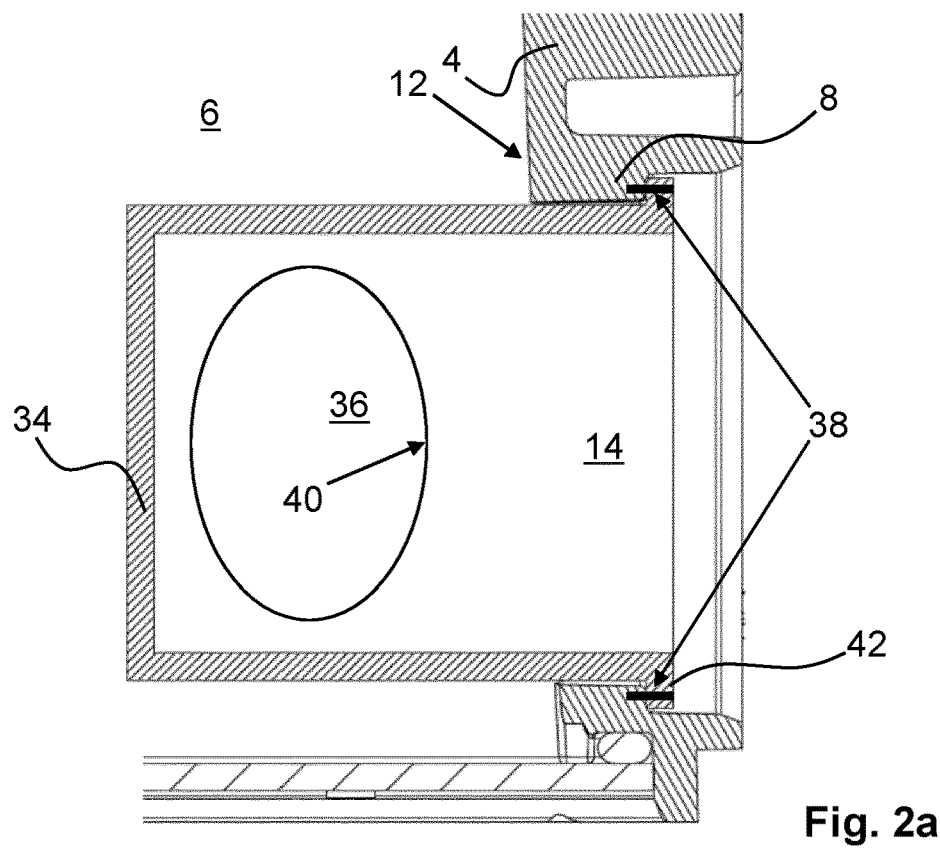
Figure 2B:
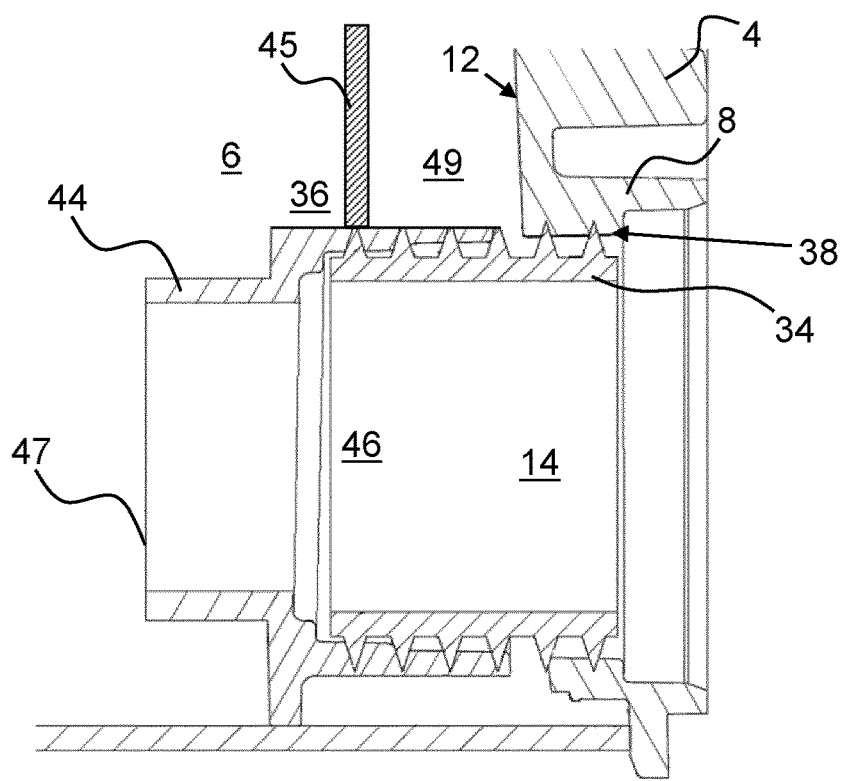

FIGS. 2a and 2b schematically illustrate cross sections through a portion of respective crankcase gas separators 2 according to embodiments. These embodiments are similar to the embodiments shown in FIG. 1. Accordingly, in the following mainly the differences between the FIG. 1 embodiments and the FIGS. 2a and 2b embodiments are discussed.

Again, the separator 2 comprises: a separator housing 4 delimiting at least part of a separation space 6 and forming at least part of a liquid phase receiving circumferential inner wall surface 12, a wall member 8 forming at least part of a gas passage 14, and a gas pressure regulating valve (not shown).

Again, the separator 2 comprises a separate tube member 34 extending from a position 36 radially inside the inner wall surface 12 into the gas passage 14. Thus, a portion of the gas passage 14 extends through the tube member 34. Again, a liquid tight seal between the separate tube member 34 and the wall member 8 is formed by a joint 38 arranged radially outside the inner wall surface 12.

In the embodiments of FIG. 2a, the joint 38 is a welded joint. The joint 38 extends circumferentially around a flange 42 of the separate tube member 34 in an axial direction of the tube member 34. Thus, providing a liquid tight joint 38 between the separate tube member 34 and the wall member 8.

The tube member 34 is provided with a circumferentially facing opening 40, though which the separated gaseous phase will flow from the position 36 within the separation space 6 into the separate tube member 34 and the gas passage 14.

According to alternative embodiments, the tube member 34, instead of being provided with the opening 40, may be a tube which is open at both its axial ends as in the other embodiments illustrated herein.

According to alternative embodiments, the joint 38 may be a welded joint between the separate tube member 34 and the wall member 8, which welded joint extends in a radial direction of the tube member 34.

In the embodiments of FIG. 2b, the joint 38 is a mechanically interlocking joint.

Exemplified as a mechanically interlocking joint in these embodiments is a threaded engagement between the tube member 34 and the wall member 8.

Also the above-mentioned press fitted joint may be an example of a mechanically interlocking joint, depending on how tight the press fit of the joint is.

In FIG. 2b also an alternative outlet for the gaseous phase from the separation space 6 is shown. This alternative outlet may be used also in the separator of the embodiments of FIGS. 1 and 2a.

The separator 2 comprises a gas channel forming member 44 arranged within the separator housing 4. A gas channel 46 extends through the gas channel forming member 44. The separate tube member 34 extends into the gas channel 46. In this manner, an outlet for the gaseous phase from the separation space 6 may be arranged at a specific position within the separation space 6.

More specifically, the gas channel forming member 44 may be designed such that an inlet end 47 of the gas channel forming member 44 is arranged at the specific position within the separation space 6.

Since the separate tube member 34 extends into the gas channel 46, the separate tube member 34 ensures that the separate gaseous phase flows through the gas channel 46 and exits the separation space 6 at the specific position within the separation space 6.

The separate tube member 34 may seal against the gas channel forming member 44. In this manner, it may be ensured that all of the separated gaseous phase exits the separation space 6 from an end of the gas channel forming member 44 at the intended position within the separation space 6.

In the embodiments of FIG. 2b, a mechanically interlocking joint is formed between the tube member 34 and the gas channel forming member 44 for the tube member 34 to seal against the gas channel forming member 44.

Other kinds of joints may alternatively be provided between the tube member 34 and the gas channel forming member 44, such as a welded joint, a glued joint, or a press fitted joint.

The gas channel forming member 44 may form part of a stationary housing member 45 arranged within the separation space 6. Between the inner wall surface 12 and the stationary housing member 45 there may be define a region 49 for receiving the liquid phase and directing it towards an outlet form the separation space 6.

Figure 3:
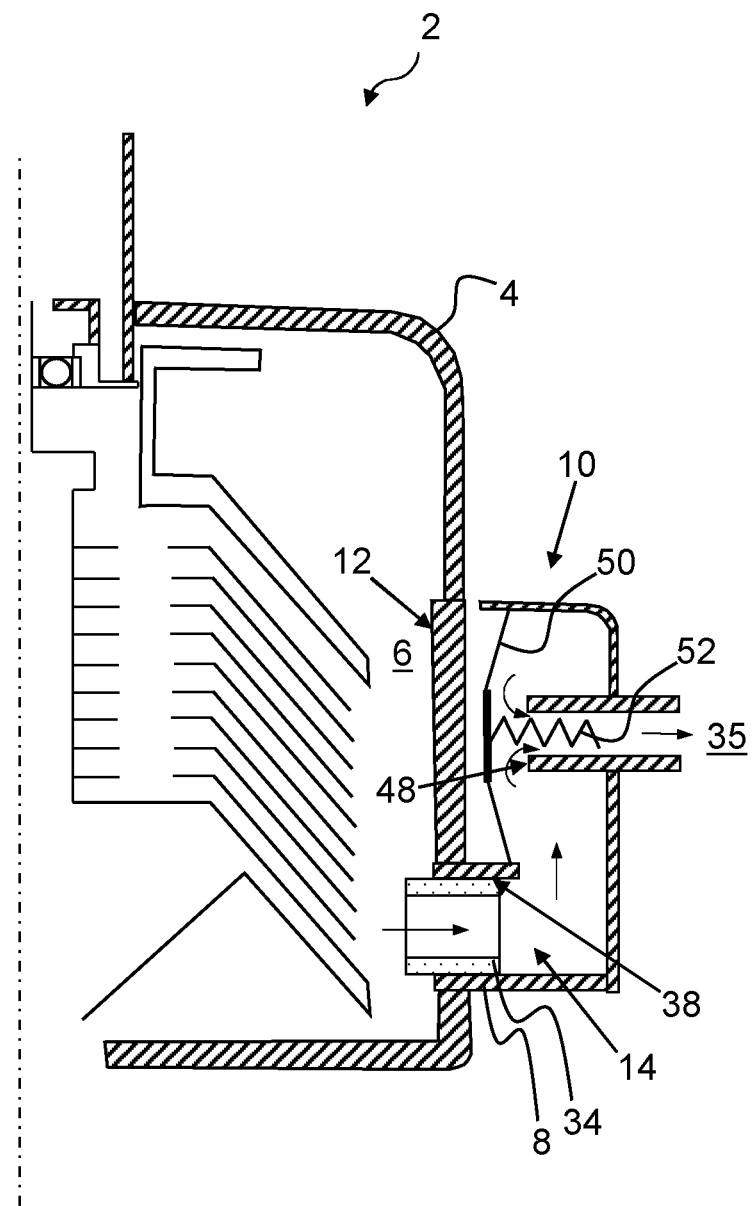

FIG. 3 schematically illustrates a cross section through a portion of a crankcase gas separator 2 according to embodiments.

The separator 2 may be a separator 2 according to the embodiments discussed above with reference to FIG. 1 and may comprise a separate tube member 34 joined to a wall member 8 according to any one of embodiments discussed above with reference to FIGS. 1-2*b*.

Briefly, again, the separator 2 comprises: a separator housing 4 delimiting at least part of a separation space 6 and forming at least part of a liquid phase receiving circumferential inner wall surface 12, the wall member 8 forming at least part of a gas passage 14, and the separate tube member 34. A liquid tight seal is formed by a joint 38 between the separate tube member 34 and the wall member 8.

Again, the separator 2 comprises a gas pressure regulating valve 10.

According to the illustrated embodiments, the gas pressure regulating valve 10 comprises a valve seat 48 and a membrane 50 configured to seal against the valve seat 48. The gas passage 14 extends at least upstream of the valve seat 48.

In this manner, the valve 10 may be provided as a biased valve as discussed above.

A spring member 52 biases the membrane 50 into an open position permitting the gaseous phase to flow through the valve 10. If however, a pressure downstream of the valve seat 48 is at such a low level that its resulting force affecting the membrane 50, exceeds a total force of the spring member 52 and the force caused by the pressure affecting the membrane 50 upstream of the valve seat 48, the valve 10 will close. The valve 10 will open again once the pressure difference between upstream and downstream the valve seat 48 is such that the bias of the spring member 52 causes the membrane 50 to move away from the valve seat 48.

In FIG. 3, the valve 10 is shown in an open state and the flow of the separated gaseous phase through the gas passage 14 and the valve 10 to a gas outlet 35 of the separator 2 is indicated with arrows.

At least part of a housing of the valve 10 may form part of the separator housing 4. Accordingly, the gas passage 14 may be formed in the separator housing 4 and optionally, also in a housing of the valve 10.

A separate portion of a housing of the valve 10 may be sealed against the housing 4 of the separator 2. Such sealing may be achieved by the separate tube member 34. Alternatively, such sealing may be achieved by a sealing member separate from the tube member 34, e.g. in the form of a weld, a glue joint, an O-ring, etc.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A crankcase gas separator comprising:
a separator housing delimiting at least part of a separation space and forming at least part of a liquid phase receiving circumferential inner wall surface;
a wall member forming at least part of a gas passage;
a gas pressure regulating valve comprising at least part of the gas passage; wherein the separation space is arranged in fluid communication with the gas passage; and
a separate tube member extending from a position radially inside the inner wall surface into the gas passage,
wherein a liquid tight seal between the separate tube member and the wall member is formed by a joint arranged radially outside the inner wall surface.

2. The separator according to claim 1, wherein the joint is a welded joint.

3. The separator according to claim 2, wherein the joint is a press fitted joint.

4. The separator according to claim 2, wherein the joint is a mechanically interlocking joint.

5. The separator according to claim 2, wherein the joint forms the only liquid tight seal between the separate tube member and the wall member.

6. The separator according to claim 1, wherein the joint is a press fitted joint.

7. The separator according to claim 6, wherein the joint is a mechanically interlocking joint.

8. The separator according to claim 6, wherein the joint forms the only liquid tight seal between the separate tube member and the wall member.

9. The separator according to claim 1, wherein the joint is a mechanically interlocking joint.

10. The separator according to claim 9, wherein the joint forms the only liquid tight seal between the separate tube member and the wall member.

11. The separator according to claim 1, wherein the joint is a glue joint.

12. The separator according to claim 11, wherein the joint forms the only liquid tight seal between the separate tube member and the wall member.

13. The separator according to claim 1, wherein the joint forms the only liquid tight seal between the separate tube member and the wall member.

14. The separator according to claim 1, wherein the separate tube member is made from a same material as the wall member.

15. The separator according to claim 1, wherein the separate tube member is made from a different material than the wall member.

16. The separator according to claim 15, wherein the separate tube member is made from a rubber material.

17. The separator according to claim 1, further comprising a gas channel forming member arranged within the separator housing,
wherein a gas channel extends through the gas channel forming member, and
wherein the separate tube member extends into the gas channel.

18. The separator according to claim 17, wherein the separate tube member seals against the gas channel forming member.

19. The separator according to claim 1, wherein the gas pressure regulating valve comprises a valve seat and a membrane configured to seal against the valve seat, and
wherein the gas passage extends at least upstream of the valve seat.

20. The separator according to claim 1, wherein in an operating position of the separator, the gas passage is arranged at a lower end portion of the separation space.

* * * * *